United States Patent
Waibel et al.

(10) Patent No.: US 10,455,268 B2
(45) Date of Patent: Oct. 22, 2019

(54) METHOD AND SYSTEM FOR TARGETED COMMERCE IN NETWORK BROADCASTING

(71) Applicant: PayPal, Inc., San Jose, CA (US)

(72) Inventors: Heather Anne Waibel, Austin, TX (US); Nicholas Albert Rudock, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 15/590,744

(22) Filed: May 9, 2017

(65) Prior Publication Data
US 2017/0311019 A1    Oct. 26, 2017

Related U.S. Application Data

(63) Continuation of application No. 14/836,265, filed on Aug. 26, 2015, now Pat. No. 9,648,371, which is a continuation of application No. 14/461,181, filed on Aug. 15, 2014, now Pat. No. 9,148,685, which is a continuation of application No. 13/719,747, filed on Dec. 19, 2012, now Pat. No. 8,863,175.

(51) Int. Cl.
| | |
|---|---|
| *H04N 21/2668* | (2011.01) |
| *H04N 21/435* | (2011.01) |
| *H04N 21/234* | (2011.01) |
| *H04N 21/81* | (2011.01) |
| *H04N 21/466* | (2011.01) |
| *H04N 21/478* | (2011.01) |
| *H04N 21/8545* | (2011.01) |
| *H04N 21/858* | (2011.01) |
| *H04L 29/06* | (2006.01) |

(52) U.S. Cl.
CPC ..... *H04N 21/2668* (2013.01); *H04L 65/4076* (2013.01); *H04N 21/23418* (2013.01); *H04N 21/435* (2013.01); *H04N 21/4668* (2013.01); *H04N 21/47815* (2013.01); *H04N 21/812* (2013.01); *H04N 21/858* (2013.01); *H04N 21/8545* (2013.01)

(58) Field of Classification Search
CPC ......... H04N 21/2668; H04N 21/23418; H04N 21/435; H04N 21/4668; H04N 21/47815; H04N 21/812; H04N 21/8545
See application file for complete search history.

(56) References Cited

U.S. PATENT DOCUMENTS

| | | |
|---|---|---|
| 6,711,590 B1 | 3/2004 | Lennon |
| 7,870,576 B2 | 1/2011 | Eldering |
| 2004/0054587 A1 | 3/2004 | Dev et al. |
| 2004/0268419 A1 | 12/2004 | Danker et al. |

(Continued)

*Primary Examiner* — Nasser M Goodarzi
*Assistant Examiner* — Adil Ocak
(74) *Attorney, Agent, or Firm* — Haynes and Boone, LLP

(57) ABSTRACT

A system and a method for using the system for targeted commerce in network broadcasting are provided. The system includes an interface device configured to receive a multimedia stream from a network, wherein the multimedia stream includes a close captioning string and wherein the interface device is further configured to process the multimedia stream by providing advertisements in the multimedia stream according to a correlation between the close captioning string and a plurality of vendor keywords; and a viewing device configured to receive the processed multimedia stream and display to a viewer.

20 Claims, 7 Drawing Sheets

(56) References Cited

U.S. PATENT DOCUMENTS

| | | |
|---|---|---|
| 2005/0137958 A1 | 6/2005 | Huber et al. |
| 2006/0277103 A1 | 12/2006 | Fujita et al. |
| 2007/0250901 A1* | 10/2007 | McIntire ............ H04N 7/17318 |
| | | 725/146 |
| 2007/0294729 A1 | 12/2007 | Ramaswamy |
| 2008/0133342 A1* | 6/2008 | Criou .................... G06Q 30/02 |
| | | 705/14.41 |
| 2008/0221989 A1 | 9/2008 | Messer et al. |
| 2009/0222853 A1 | 9/2009 | White et al. |
| 2009/0276402 A1 | 11/2009 | Stiers |
| 2009/0293086 A1 | 11/2009 | Lutterbach et al. |
| 2013/0251338 A1* | 9/2013 | Abecassis .............. H04N 5/445 |
| | | 386/241 |
| 2013/0347032 A1 | 12/2013 | Geraci |
| 2014/0007162 A1* | 1/2014 | Harrison ................ H04L 63/10 |
| | | 725/35 |
| 2014/0372210 A1* | 12/2014 | Watfa ................ G06Q 30/0251 |
| | | 705/14.49 |

* cited by examiner

METHOD AND SYSTEM FOR TARGETED COMMERCE IN NETWORK BROADCASTING

CROSS-REFERENCE TO RELATED APPLICATIONS

The present application is a continuation of U.S. patent application Ser. No. 14/836,265, filed Aug. 26, 2015 and issued as U.S. Pat. No. 9,648,371 on May 9, 2017, which is a continuation of U.S. patent application Ser. No. 14/461,181, filed on Aug. 15, 2014 and issued as U.S. Pat. No. 9,148,685 on Sep. 29, 2015, which is a continuation of U.S. patent application Ser. No. 13/719,747, filed on Dec. 19, 2012 and issued as U.S. Pat. No. 8,863,175 on Oct. 14, 2014, all of which are herein incorporated by reference. The present disclosure is also related to U.S. patent application Ser. No. 13/529,905, entitled "Method and System for Targeted Broadcast Advertising", by Chad Anthony Geraci, filed on Jun. 21, 2012 and published as U.S. Pat. Appl. Publ. No. 2013/0347032, which is herein incorporated by reference.

BACKGROUND

Field of the Invention

Embodiments disclosed herein relate generally to the field of commerce in multimedia broadcasting; more particularly, embodiments disclosed herein relate to the field of targeted commerce in network broadcasting.

Description of Related Art

In state-of-the-art network broadcasts, commercials may not be correlated with a broadcasting program, be it a TV show or a video downstream from a media outlet. Therefore, vendors may miss opportunities to advertise products, and may pitch products to inappropriate or uninterested audiences, wasting resources. Typically, advertising strategies are matched to audiences modeled by broadcasters prior to broadcasting, based on marketing strategies, program ratings, and program schedules. While these marketing models have become increasingly complicated, there are still inefficiencies in the strategies used. Moreover, with the advent of new consumer electronic devices and network capabilities, potential consumers may be watching a program at any time of the day, in any place. Audiences have become dispersed geographically and chronologically, making current marketing models obsolete and inappropriate.

Furthermore, in many instances a viewer may be interested in purchasing an item immediately, while watching a broadcast. The sale is potentially lost when the viewer has no direct purchasing access to the item, since the viewer's attention may shift away from the item at a different time during or after the broadcast.

What is needed is an alternative method of commerce in network broadcasting that is flexible and increases sales opportunities for buyers and vendors.

BRIEF DESCRIPTION OF THE DRAWINGS

In the figures, elements having the same reference number have the same or similar functions.

DETAILED DESCRIPTION

Figure 1:
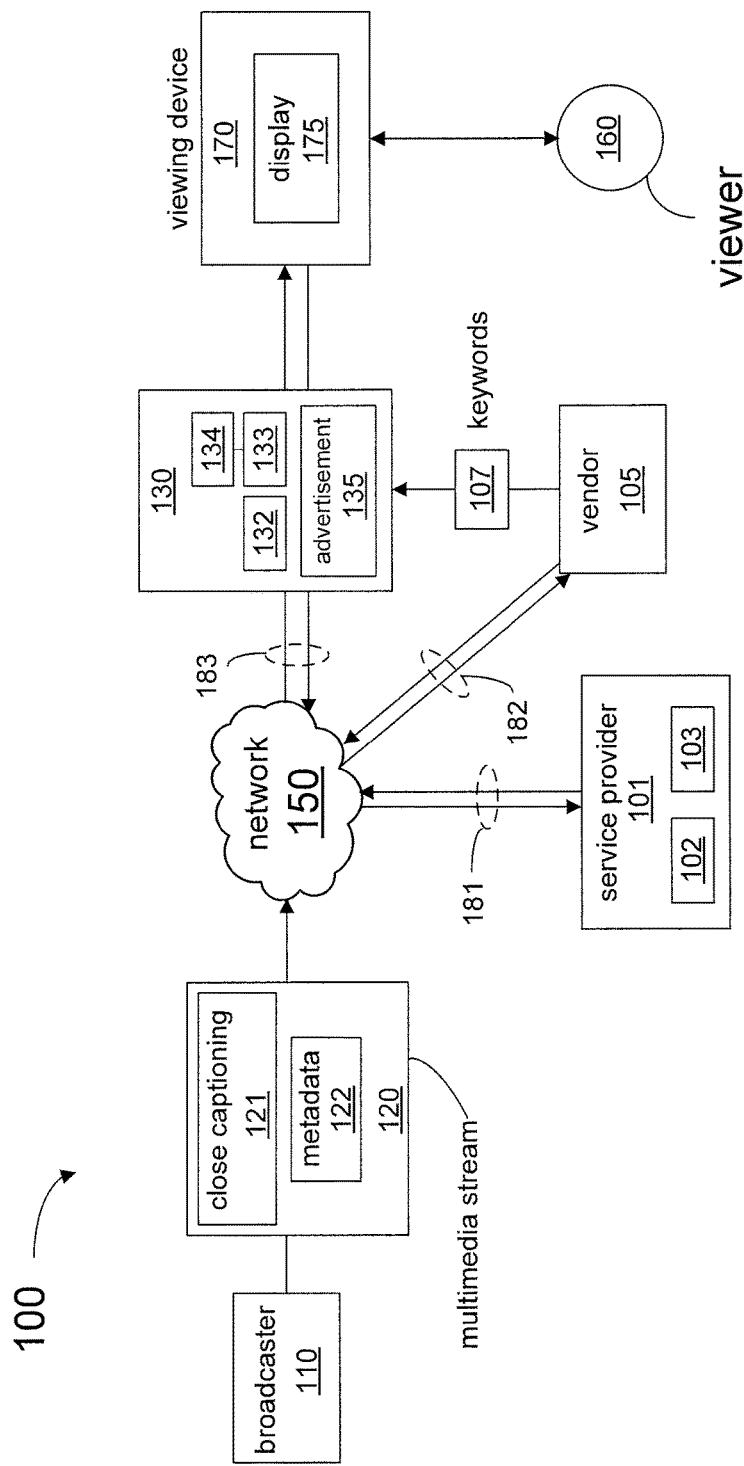
FIG. 1 shows a system for targeted commerce in network broadcasting, according to some embodiments.

According to some embodiments a system for targeted commerce in network broadcasting includes an interface device configured to receive a multimedia stream from a network, wherein the multimedia stream includes a close captioning string and wherein the interface device is further configured to provide advertisements in the multimedia stream according to a correlation between the close captioning string and a plurality of vendor keywords; and a viewing device configured to receive the processed multimedia stream and display the multimedia stream to a viewer.

According to some embodiments, a system may include a server, the server including a processor circuit and a memory circuit, wherein: the processor circuit is configured to: provide a network link to an interface device, the network link embedded in an advertisement, and to provide a viewer purchase profile to the interface device, the viewer purchase profile including items of interest for a viewer; access a vendor account through the network, and store the vendor account information in the memory circuit; access an account for the viewer through the network; and transfer funds from the viewer account to the vendor account upon a viewer selection of the network link embedded in the advertisement.

According to some embodiments, a non-transitory machine-readable medium including a plurality of machine-readable instructions which when executed by one or more processors of an interface device are adapted to cause the interface device to perform a method including: receiving a multimedia stream from a network, the multimedia stream including a close captioning text; finding correlation values between the close captioning stream and a plurality of vendor keywords; and providing an advertisement in the multimedia stream according to the correlation values.

According to embodiments disclosed herein, a method for targeted commerce in network broadcasting may include storing, electronically in a memory circuit of an interface device a plurality of keywords related to an item for sale by a vendor; finding, electronically by a processor circuit in the interface device correlation values between vendor keywords and a close captioning in a multimedia stream; placing an advertisement field for the item at selected locations in the multimedia stream according to the correlation values; placing a payment tab on the advertisement field; and displaying an advertisement in the advertisement field at pre-determined events performed by a viewer accessing the multimedia stream.

Embodiments in this disclosure include methods and systems for using closed captioning for targeted commerce in network broadcasting. The broadcast may include a multimedia stream provided through a broadcast medium. The broadcast medium may be open space, electrical cables and wires, fiber optics networks, or a combination of the above. Targeted commerce includes advertisements relevant to the broadcast content so that the viewer will be naturally interested in the advertisement. Targeted commerce may also include the ability for the viewer to immediately purchase an advertised item using a network and a service provider on the network. In any given program broadcast including video, close captioning is keyword rich by nature. Close captioning in a broadcast may be used for targeted commerce by matching a keyword of interest for advertising and immediate sale of a product or service to an appropriate audience.

According to some embodiments, an interface device receiving a multimedia stream through a network queries closed captioning text in the stream. The interface device matches specific products or terms with advertisements that read upon the product in the close caption text. Or that share enough similarity with the product in the close caption text such that the advertisement is "relevant." The similarity between an advertised product and the multimedia stream content may be measured using a correlation function between a vendor provided keyword and the close captioning text. The keyword may be selected from a list of keywords stored in the interface device. The correlation function may be in the form of a language correlation. A correlation function may have a larger value if the keyword for the item is literally included in the close captioning. In some embodiments, a correlation function may have a large value when an item matching the keyword description is displayed in a frame of the multimedia stream.

FIG. 1 shows a system 100 for targeted commerce in network broadcasting according to some embodiments. System 100 includes a service provider 101, a vendor 105, a broadcaster 110, and a network 150. Broadcaster 110 generates a multimedia stream 120 that is transmitted through network 150. Broadcaster 110 may be a traditional TV station or network, or a web-based server providing video content. For example, broadcaster 110 may be a news outlet providing content to the internet, a video source linked to a search engine, or a server providing movies to registered users.

According to some embodiments, multimedia stream 120 is received by an interface device 130. Interface device 130 processes multimedia stream 120 using a processor circuit 132. Processor circuit 132 operates on multimedia stream 120 by executing commands stored in a memory 133. Interface device 130 may store portions of multimedia stream 120 in memory 133, using processor circuit 132. Memory 133 may include a memory circuit and a recordable medium, such as a DVD, a hard drive, a flash drive, or any other recordable medium, such as a non-transitory, machine readable medium. In some embodiments, interface device 130 may include a 'wish list' 134 stored in memory 133. Purchase profile 134 includes lists of items that viewer 160 may be interested in purchasing. Purchase profile 134 may include a generic list of items, such as 'books', or 'men's clothing', or 'women's clothing'. In some embodiments, purchase profile 134 may be more specific, such as 'kitchen supplies', 'surfing gear', 'women's shoes', or the like. Items in purchase profile 134 may include also services such as 'travel' or 'mobile phone plans' or 'health'.

Interface device 130 provides the processed multimedia stream to a viewer 160 on a viewing device 170 including a display 175. Interface device 130 may receive multimedia stream 120 from network 150 via a free space antenna (such as a dish), a cable connection, or any other form of network connection through network link 183. Viewing device 170 may be a TV display, a cell phone, a laptop, a computing tablet, a smart phone, or a desktop computer. Interface device 130 may perform digital data processing on multimedia stream 120. For example, interface device 130 may perform analog-to-digital conversion when multimedia stream includes analog data. In some embodiments, interface device 130 may buffer portions of multimedia stream 120 prior to providing the processed stream to viewing device 170. According to some embodiments, interface device 130 may include an advertisement 135 in multimedia stream 120, displayed to viewer 160 by viewing device 170. Advertisement 135 may be a targeted advertisement, selected according to close captioning 121 and metadata 122 in multimedia stream 120, and also selected according to 'wish list' 134.

FIG. 1 illustrates a service provider 101, such as PayPal, Inc. of San Jose, Calif., having a link 181 to network 150. Vendor 105 includes a link 182 to network 150. Each one of links 181, 182, and 183 may be part of a network. For example, links 181, 182, and 183 may be a cell phone network, a wireless network, an Ethernet network, or any combination of the above. In some embodiments vendor 105 may be a registered user of service provider 101. In some embodiments, viewer 160 may also be a registered user of service provider 101. In some embodiments, service provider 101 may include a computer having a processor circuit 102 and a memory circuit 103. Thus, the operations of service provider 101 as described below may be performed electronically by processor 102 executing commands and using data, the commands and the data stored in memory circuit 103.

Vendor 105 may use an account in service provider 101 to provide a remote payment mechanism for viewer 160, in advertisement 135. Viewer 160 may use an account in service provider 101 to pay for an item using a remote payment option placed by interface device 130 for vendor 105, in advertisement 135.

Multimedia stream 120 may include metadata 122 and a close captioning string 121. Interface device 130 inserts advertisements 135 in multimedia stream 120 according to a correlation between metadata 122, close captioning 121, and a plurality of vendor keywords 107. Vendor keywords 107 may be provided by vendor 105 to interface device 130 upon a contract agreement with the manufacturer of interface device 130. Vendor keywords 107 describe or characterize the main aspects of a product offered for sale by vendor 105. For example, in some embodiments keywords 107 may be placed in memory 133 of interface device 130 at the time of assembly of interface device 130. In some embodiments, vendor keywords 107 may be provided by vendor 105 through network 150, using links 182 and 183.

In some embodiments, interface device 130 may provide advertisement 135 according to purchase profile 134. In such embodiments, interface device 130 may further use purchase profile 134 to perform a correlation with metadata 122, close captioning 121, and vendor keywords 107. Interface device 130 may have information as to the identity of viewer 160 prior to, or during, the broadcasting of multimedia stream 120. This information may be obtained by interface device 130 when viewer 160 logs in, to access program content from broadcaster 110. In some embodiments, purchase profile 134 may be created in interface device 130 following a history of purchases by viewer 160. Based on the correlation, interface device 130 may determine a targeted advertising to display for viewer 160. The targeted advertisement may best match the viewer's expressed interest on an item to a broadcast content. Accordingly, advertisements 135 may be retrieved by interface device 130 from network 150 using link 183. For example, once a match is found in interface device 130 for an item in close captioning 121 or metadata 122, interface device 130 may look for a selected advertisement in network 150. Interface device 130 may download the advertisement and place it in processed multimedia stream 120 to be displayed for viewer 160. Processed multimedia stream 120 may be stored by interface device 130 in memory 133. Thus, selected advertisement 135 may be played in viewing device 170 repeatedly, as viewer 160 may desire to replay the program content in multimedia stream 120.

While FIG. 1 illustrates element 105 as a vendor, it should be understood by those of ordinary skill that element 105 may be any organization that collects funds through advertisement. For example, a non-profit organization dedicated to charity or any other activity using funds from the viewing audience may use methods and systems for targeted broadcast advertising as disclosed herein. In this regard, aid organizations established on a permanent basis (disease research or vaccination campaigns) or in natural disasters, may use methods and systems for targeted commerce in network broadcasting as disclosed herein.

According to some embodiments, interface device 130 and viewing device 170 may be part of the same television unit, co-local with viewer 160. For example, interface device 130 may be a circuit embedded into viewing device 170. In some embodiments interface device 130 may be a separate box coupled to network link 183 on one end and coupled to viewing device 170 on another end.

Figure 2:
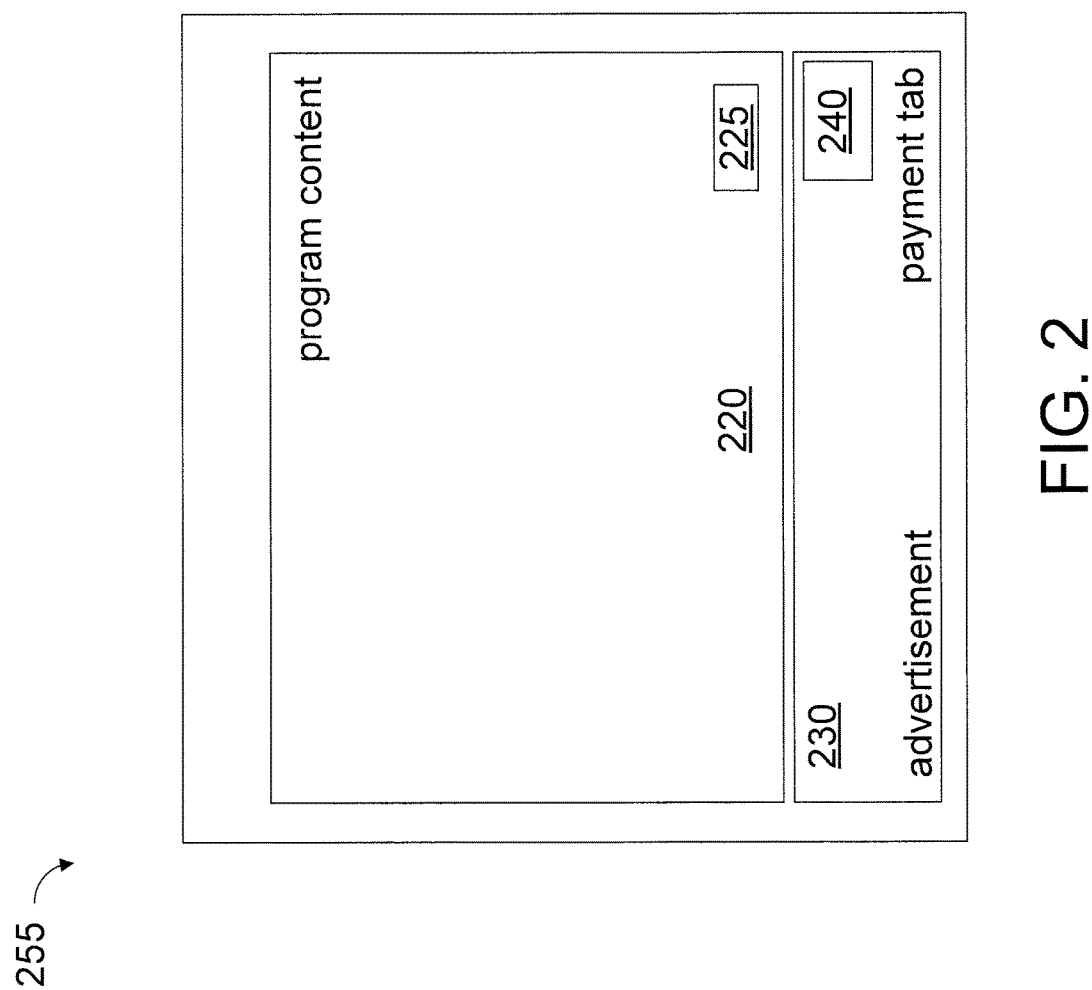
FIG. 2 shows a display in a system for targeted commerce in network broadcasting, according to some embodiments.

FIG. 2 shows a display 255 in a system for targeted commerce in network broadcasting, according to some embodiments. Display 255 includes a canvas 220 to display the program content, and an advertisement field 230 to display a targeted advertisement. In some embodiments advertisement field 230 includes a payment tab 240. In some embodiments payment tab 240 may be provided by private account service provider 101. Thus, a viewer interested in purchasing some of the advertised products may select payment tab 240 and complete a transaction using network 150, while watching the program content. According to some embodiments, advertisement field 230 may display targeted advertisement 135 while program content 220 is streaming continuously. Thus, targeted advertisements 135 may be placed in advertisement field 230 according to a strong correlation with the streaming close caption string 121, the visual display in program content 220, and keywords 107. Targeted advertisements as displayed in field 230 including payment tab 240 so that a viewer may immediately purchase an advertised item or service may referred to as 'smart ads.'

Interface device 130 embeds advertisement 135 in multimedia stream 120 when a specific product name has been mentioned in closed captioning 121. In some embodiments, interface device 130 displays advertisement 135 when a correlation match occurs for a vendor's product in relation to close captioning 121, metadata 122, and purchase profile 134. In some embodiments interface device 130 displays advertisement 135 when a specific product name appears in close captioning 121 and the product is also visually displayed in a frame in broadcast program 220. In some embodiments interface device 130 displays advertisement 135 when a generic item is mentioned in close captioning 121. The generic item may be related to vendor keywords 107, or a viewer's purchase profile 134. In some embodiments interface device 130 displays advertisement 135 when a generic item is shown in the broadcast program.

Further according to embodiments consistent with the present disclosure, interface device 130 displays advertisement 135 when a correlation match occurs between close captioning 121 and purchase profile 134. In some embodiments, interface device 130 compares a correlation match to purchase profile 134; if there is a match, displaying advertisement 135 may include a cost to vendor 105. Further according to some embodiments, interface device 130 may display advertisement 135 in multimedia stream 120 for products or services in purchase profile 134 matching vendor keywords 107. In some embodiments, service provider 101 may provide purchase profile 134 through link 183 to be stored in memory 133 in interface device 130. According to some embodiments, a revenue stream may include a fee charged by service provider 101 to either vendor 105, viewer 160, or both. In some embodiments, advertisement 135 may be placed in multimedia stream 120 by broadcaster 110. In such configuration, broadcaster 110 may receive a payment from vendor 105, for placing advertisement 135 in multimedia stream 120. Configurations where broadcaster 110 places advertisement 135 in multimedia stream 120 may be as disclosed in detail in U.S. patent application Ser. No. 13/529,905, entitled "Method and System for Targeted Broadcast Advertising", by Chad Anthony Geraci, filed on Jun. 21, 2012 and published as U.S. Pat. Appl. Publ. No. 2013/0347032, the contents of which are herein incorporated by reference, in their entirety, for all purposes.

Interface device 130 may select to display advertisement 135 for viewer 160 at any point during a broadcast. Accordingly, interface device 130 may display advertisement 135 in multimedia stream 120 while program content 220 is paused by viewer 160. Thus, more than one advertisement 135 may be inserted in multimedia stream 120 by interface device 130, if more than one vendor item has obtained a high correlation value. According to some embodiments, interface device 130 may store in memory 133 a number of vendor items that have reached a high correlation value between a first point in multimedia stream 120 and a second point in multimedia stream 120. For example, the first point and the second point in multimedia stream 120 may be a 'pause' action or a 'fast forward' action by viewer 160 in the program. In some embodiments, a first point in multimedia stream 120 may be the start of program content 220, and a second point in multimedia stream 120 may be the end of program content 220.

According to some embodiments, viewer 160 may pause program content 220 when an item of interest is advertised in advertisement field 230. Further according to some embodiments, display of advertisement field 230 may be optional, by viewer 160. Upon pausing program content 220, an interactive box 225 may appear in program content 220 requesting input from viewer 160 as to whether or not advertisement field 230 should be displayed. The viewer may use payment tab 240 to purchase an advertised product or service, such as by selecting payment tab 240 via a remote control device, a user touch, or a pointing device. In such embodiments, viewer 160 may decide to turn advertisement field 230 'on' when an item of interest appears on display 255. Viewer 160 may decide to turn advertisement field 230 'on' when an item or service of interest is mentioned in the context of program content 220. For example, interactive box 225 may stay on display 255 for a selected period of time, predetermined by interface device 130. The period of time may be determined upon a contract between vendor 105, and the manufacturer of interface device 130.

In some embodiments, viewer 160 may be a registered user with service provider 101, having an account login and a password or personal identification number (PIN). Thus, when viewer 160 presses or taps on payment tab 240, viewer 160 may be directed to service provider 101 through network 150. Viewer 160 may then be prompted to enter account login information and a password or PIN, to access a private funds account with service provider 101. When doing so, viewer 160 may then finalize the purchase of the product advertised in advertisement field 230. In some embodiments, service provider 101 may contact viewer 160 to authenticate and complete the purchase using e-mail or texting messages through network 150.

In some embodiments consistent with the present disclosure, once the purchase is authenticated by viewer 160 through network 150, service provider 101 may contact vendor 105 through network 150 to provide details of the purchase. Furthermore, according to some embodiments vendor 105 may also be a registered user of service provider 101. Thus, service provider 101 may transfer funds from a viewer account to a vendor account within service provider 101 after the purchase has been authenticated by viewer 160.

As a method of authentication, viewer 160 may enter a mobile number and personal identification number (PIN). The mobile number and PIN may be stored in memory circuit 103 within service provider 101, associated to a viewer's private account. In some embodiments, personal information from viewer 160 may be stored in memory 133. Once service provider 101 verifies the viewer's account, the purchase is completed. Service provider 101 transfers funds from the viewer's account to the vendor's account when the purchase is completed. According to some embodiments, the fund transfer may take a few minutes, or even less. Upon successful fund transfer, viewer 160 may receive a confirmation screen on display 175 and a receipt from service provider 101. In some embodiments, service provider 101 may send a sales receipt to viewer 160 in email form, through network 150. In some embodiments, the subject line may read "Receipt from X merchant" and contain details of the purchase including total, date, and time. One of ordinary skill will recognize that the specific language using in a communication between service provider 101 and viewer 160 is illustrative only, and not limiting. In some embodiments an e-mail receipt from service provider 101 to viewer 160 may include offers of related items from the vendor. In some embodiments, further offers of vendor's product included in a communication from service provider 101 to viewer 160 may be part of a contract between vendor 105 and service provider 101.

Figure 3:
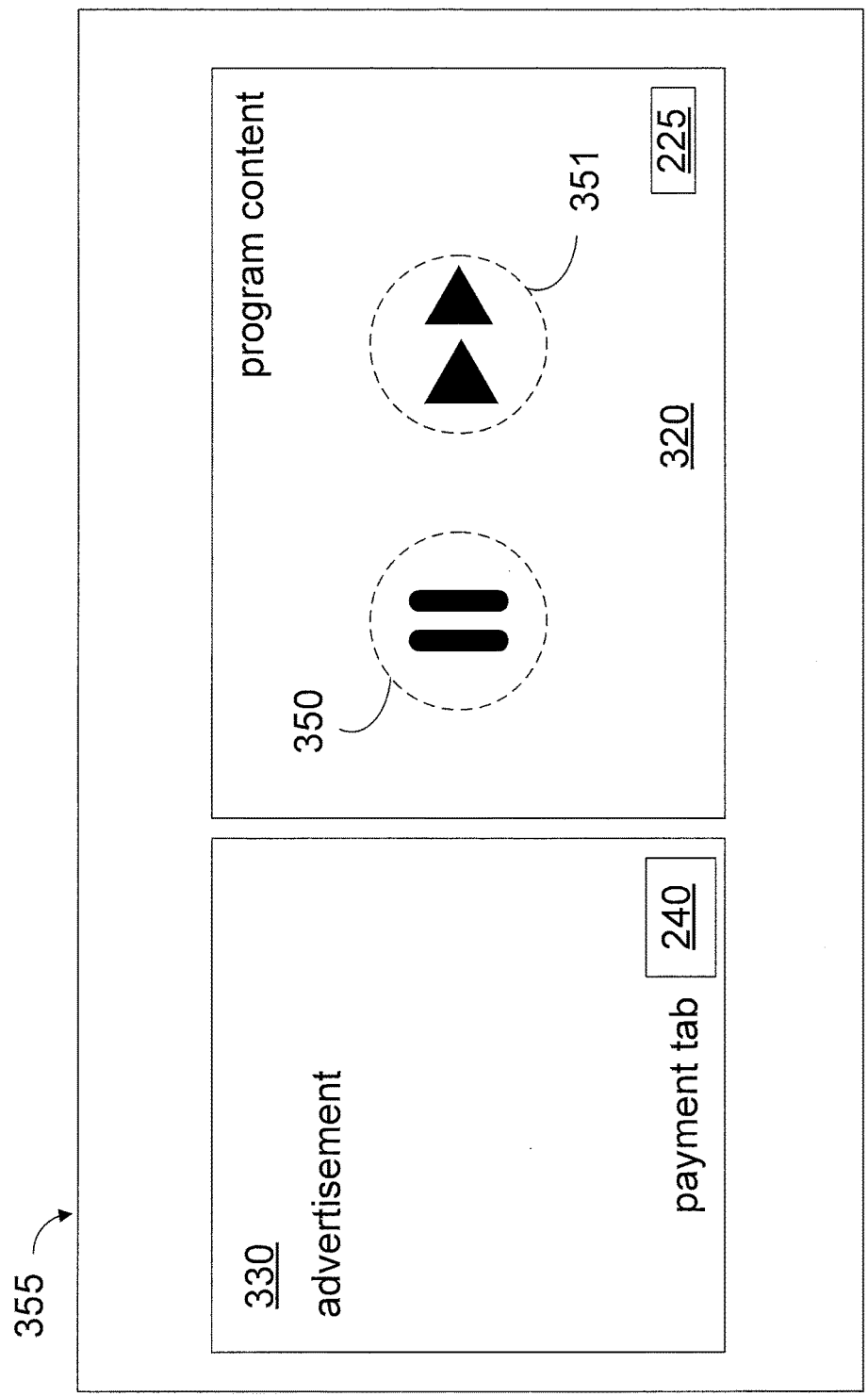
FIG. 3 shows a display in a system for targeted commerce in network broadcasting, according to some embodiments.

FIG. 3 shows a display 355 in a system for targeted commerce in network broadcasting, according to some embodiments. Display 355 includes a canvas to display a program content 320 and an advertisement field 330 to display an advertisement. In some embodiments advertisement field 330 includes a payment tab 240, as described in detail above (cf. FIG. 2). Thus, a viewer interested in purchasing some of the advertised products may select payment tab 240 and complete a transaction while pausing the program content 320. Thus, embodiments consistent with the present disclosure provide real-time targeted commerce.

According to some embodiments illustrated in FIG. 3, advertisement field 330 may be displayed to the side of display 355, upon viewer 160 taking a specific action on the video display, such as pressing the 'pause' button as shown by a 'pause' indicator 350, or the 'fast forward' button as shown by a 'fast forward' indicator 351. Further according to some embodiments, a product or service advertised in advertisement field 330 may be related to a product or service being displayed as part of program content 320. In some embodiments, the product or service advertised in advertisement field 330 may also be related to the content of a close captioning associated to program content 320. In some embodiments, advertisement field 330 displays a product or service related to a close captioning in program content 320 whether or not viewer 160 has the 'close captioning' option 'on,' in display 355. Consistent with embodiments disclosed herein, an interactive box 225 may be placed on program content 320, requesting input from viewer 160 as to whether or not to display advertisement 330.

In some embodiments, a viewer action on display 355 may be a tap on the screen. For example, viewer 160 may tap on an item that appears on program content 320. If the item is related to a product offered for sale by a vendor 105 having a contract with broadcaster 110, or with the manufacturer of interface device 130, then program content 320 may be paused and advertisement field 330 displayed, including purchase information for the item.

According to some embodiments, viewer 160 may be down-streaming a movie from an internet outlet. As the movie progresses, a character in the movie makes a remark including a device or service that may be offered for sale by vendor 105. When program content 320 also displays an image of the device offered for sale by vendor 105, a high correlation between the screen display, the close captioning, and the vendor's keyword may prompt display 355 to run advertisement field 330 promoting vendor's 105 product or service. For example, advertisement field 330 may be displayed upon viewer 160 'pausing' program 320 on display 355. Advertisement field 330 may provide further details about the product or service offered for sale by vendor 105. For example, advertisement field 330 may include price, availability, and any other information about a product or service, such as store location, and other related products or services offered by vendor 105.

According to some embodiments, viewer 160 may be watching a broadcast of a regular TV show in program content 320. As viewer 160 notices an item, utensil or service of interest in program content 320, the viewer may 'pause' the program 350 to take note of the item, utensil, or service of interest. As a result, interactive box 225 queries the viewer's interest on purchasing offers for the item, utensil, or service of interest. If viewer 160 gives positive feedback, viewing device 170 displays advertisement field 330 including the item, utensil, or service of interest. In addition advertisement field 330 may include payment tab 240 so that viewer 160 may complete a purchase on the spot, through network 150. For example, viewer 160 may use an interactive feature in display 175 so that viewing device 170 provides personal information from viewer 160 to an account in service provider 101 through network link 183. Vendor 105 may also have an account in service provider 101, so that service provider 101 may transfer funds from a viewer's account to a vendor's account.

Figure 4:
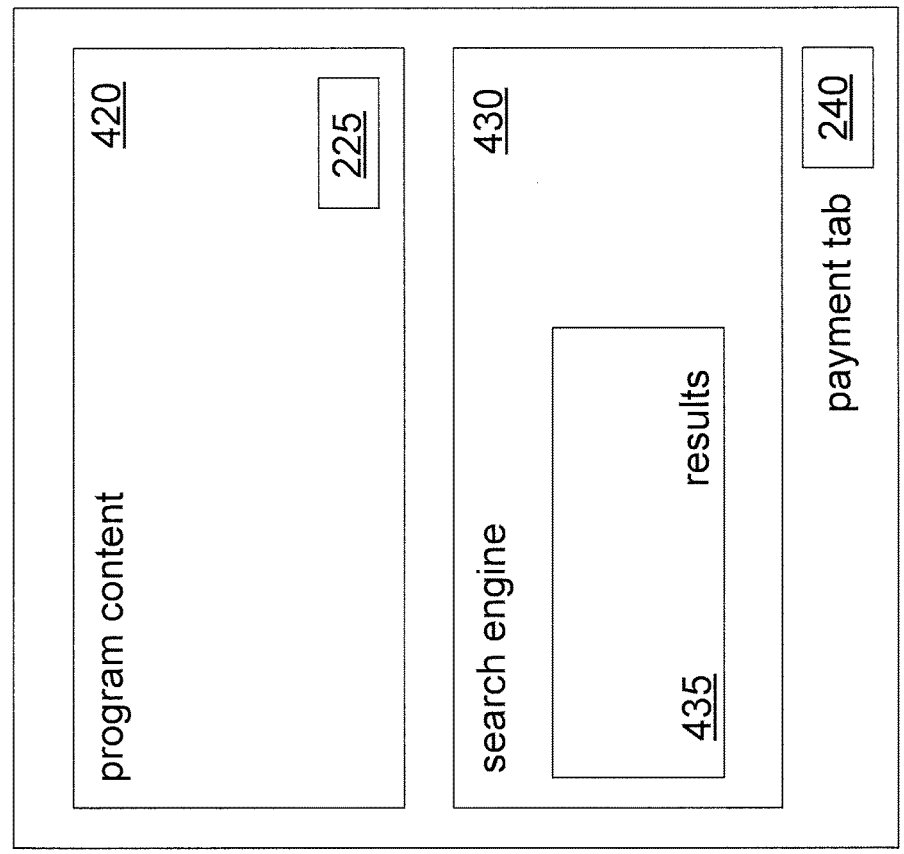
FIG. 4 shows a display in a system for targeted commerce in network broadcasting, according to some embodiments.

FIG. 4 shows a display 455 in a system for targeted commerce in network broadcasting, according to some embodiments. Display 455 includes a canvas to display a program content 420 and interactive box 225, as described in detail above (cf. FIGS. 2 and 3). Thus, upon viewer 160 showing interest on an item or service, a search engine 430 may display a plurality of results 435 of a search for an item. Search engine 430 may be running on a server in network 150. In some embodiments display 455 includes payment tab 240, described in detail above (cf. FIGS. 2 and 3). Thus, in some embodiments viewer 160 has a plurality of options to purchase an item or a service of interest. Different vendors listed in results 435 may have a contract with search engine 430 to be displayed within results 435 according to a certain order. In some embodiments, the order in which results 435 are displayed may be selected according to relevance. For example, vendors producing a higher correlation value with keywords 107 or purchase profile 134 may appear above vendors producing a lower correlation value, in results 435. In some embodiments, vendors listed in results 435 may be highlighted differently, according to relevance.

Furthermore, in some embodiments results 435 may include interactive links to access a vendor webpage through network 150. In some embodiments, the vendor webpage may include payment tab 240, so that viewer 160 may perform a purchase directly from viewing device 170.

Figure 5:
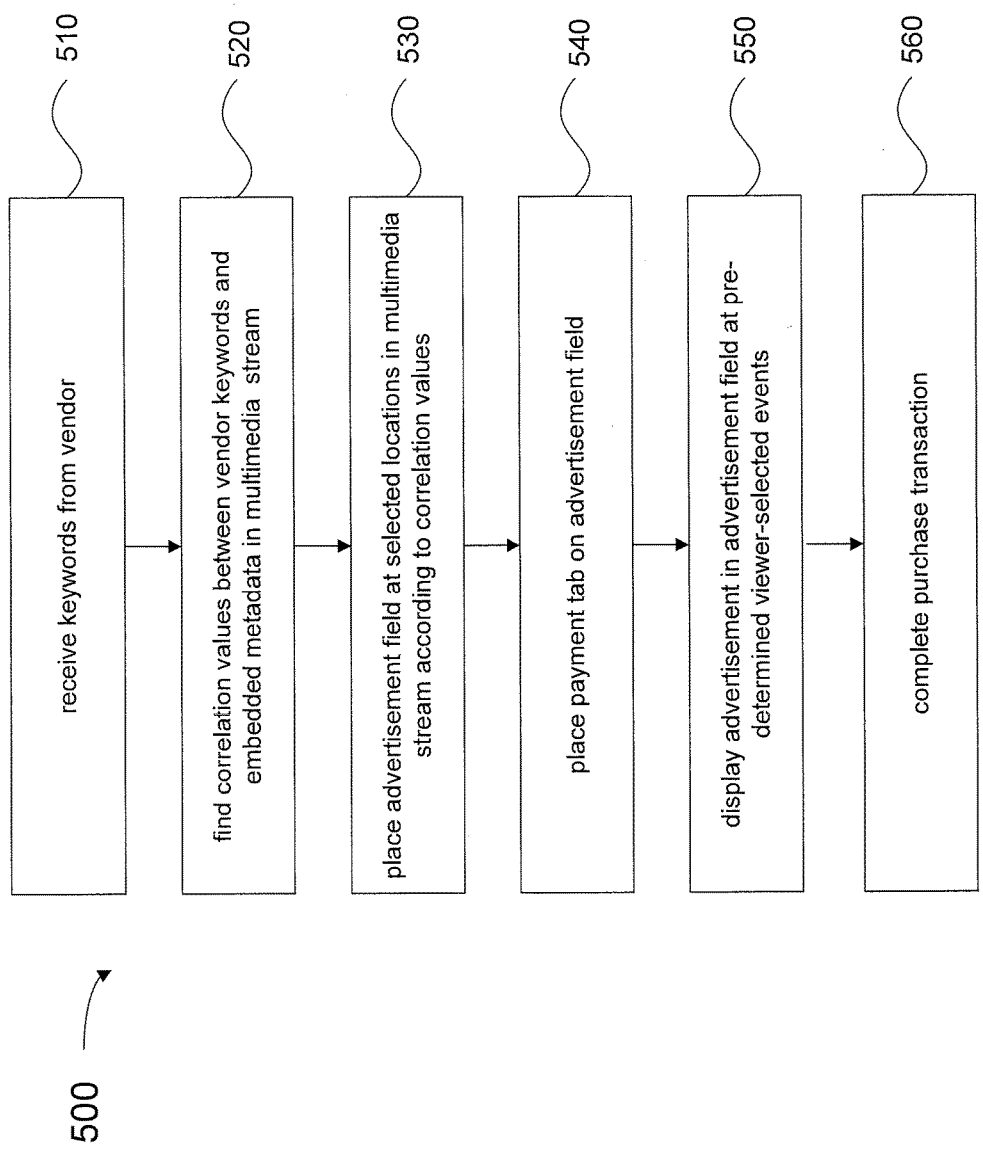
FIG. 5 shows a flow chart in a method for providing targeted commerce in network broadcasting, according to some embodiments.

FIG. 5 shows a flow chart in a method 500 for providing targeted commerce in network broadcasting, according to some embodiments. According to some embodiments, method 500 may be performed by an interface device receiving video programs or other multimedia streams for an audience that may be reached via traditional antenna transmissions, a cable network, or the internet (e.g., interface device 130, cf. FIG. 1). The video programs or other multimedia streams may be provided to a network by a broadcaster (e.g., broadcaster 110 and network 150, cf. FIG. 1). The interface device may perform steps in FIG. 5 electronically, using a processor circuit acting from commands and data stored in a memory (e.g., processor 132 and memory 133, FIG. 1). The internet may include a cell phone network, a wireless network, an Ethernet network, or any combination of the above. The audience may receive and display the multimedia data stream using a viewing device having a display (e.g., viewing device 170 and display 175, FIG. 1).

In step 510, the interface device provides a contract to a vendor. According to some embodiments, the vendor may provide a keyword set upon agreeing to a contract in step 510 (e.g., keywords 107). In step 520, the interface device finds correlation values between the keywords and embedded metadata in a broadcasted multimedia data stream to be displayed for a viewer (e.g., multimedia stream 120 and viewer 160, cf. FIG. 1). The embedded metadata may include the close captioning for the program provided by the broadcaster. The embedded metadata may also include a description of the display content. Strong correlation between what is being said and what is being shown on the screen increases the probability of displaying an advertisement.

In step 530, the interface device places an advertisement field at selected locations in the multimedia stream. In some embodiments, the interface device places targeted advertisements in an advertisement field (e.g., fields 230, 330, or 430, FIGS. 2, 3, and 4). The location within the multimedia stream selected by the interface device to place advertisements include a point where a high correlation value is found between keywords, close captioning, and the visual display (e.g., keywords 107, close captioning 121, FIG. 1). Moreover, points where the interface device places targeted advertisements in a multimedia stream may vary for different broadcasts of the same multimedia stream. Thus, when the contract provided in step 510 expires, the interface device may remove advertisements related to the vendor whose contract expired. In some embodiments, an interface device may include a 'rotating' scheme for placing targeted advertisements in a multimedia stream. For example, more than one vendor may desire to have targeted advertisements with similar keywords placed on 'prime' locations in a multimedia stream. This may be the case for vendors from a particular industry, such as kitchenware manufacturers in cooking programs. Thus, an interface device may alternate targeted advertisements from different vendors at the same or similar spot in a multimedia stream.

In step 540, the interface device places a payment tab on the advertisement field (e.g., payment tab 240, cf. FIGS. 2, 3, and 4). The payment tab may establish a direct link between the viewer and service provider 101. For example, service provider 101 may contact the viewer through link 171 (cf. FIG. 1). Thus, the viewer may purchase an item being advertised using methods and systems for targeted commerce in network broadcasting as disclosed herein. When the viewer presses or taps on a payment tab, the interface device may transmit a message to the service provider that a viewer is interested in a selected product from a vendor. The service provider may be configured to contact the vendor and the viewer to finalize purchasing transactions according to embodiments of method 500.

In step 550, the interface device displays targeted advertisements at a pre-determined, viewer-selected event. To create a high impact upon a viewer when showing the advertisements, targeted advertisements may be displayed when a viewer pauses or fast-forwards the program. Thus, a viewer-selected event in step 550 may include a 'pause' action, a 'fast-forward' action, or any other action on the multimedia stream (e.g., icons 350 and 351, cf. FIG. 3). For example, in some embodiments a viewer-selected event in step 550 may include a 'fast-forward' action (icon 351, FIG. 3). Different points in the downstream of the program content may include different advertisements mapped to what is being displayed or talked about within the program. For example, multiple advertisements may be determined between a first pause and a second pause by the viewer in a multimedia downstream, according to correlation matches between the first and second pause. In such embodiments, step 550 may include the broadcaster displaying the multiple advertisements at the second pause by the viewer. In some embodiments, in step 550, the interface viewer may choose to display a selected advertisement from multiple advertisements having a correlation match. The selected advertisement may correspond to a vendor that has placed a bid with the broadcaster to display the advertisement. In some embodiments, while multiple vendors may each place a bid with the broadcaster, the broadcaster may choose the selected advertisement according to the highest bid received.

Figure 6:
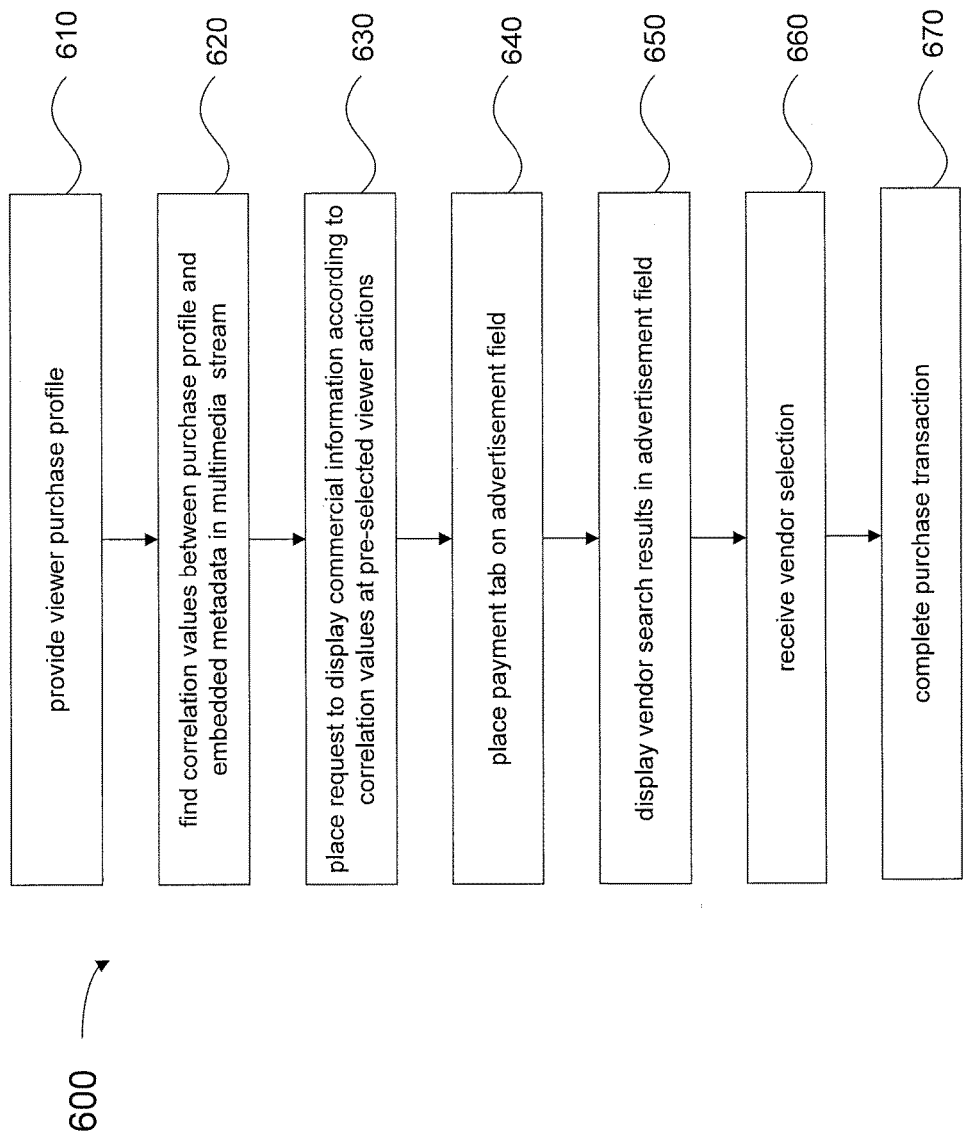
FIG. 6 shows a flow chart in a method for providing targeted commerce in network broadcasting, according to some embodiments.

FIG. 6 shows a flow chart in a method 600 for providing targeted commerce in network broadcasting, according to some embodiments. According to some embodiments, method 600 may be performed by an interface device receiving video programs or other multimedia streams for an audience that may be reached via traditional antenna transmissions, a cable network, or the internet (e.g., interface device 130, cf. FIG. 1). The internet may include a cell phone network, a wireless network, an Ethernet network, or any combination of the above. The audience may receive and display the multimedia data stream using a viewing device having a display (e.g., viewing device 170 and display 175, FIG. 1). The video programs or other multimedia streams may be provided to a network by a broadcaster (e.g., network 150 and broadcaster 110, cf. FIG. 1). The interface device may perform steps in FIG. 6 electronically, using a processor circuit acting from commands and data stored in a memory (e.g., processor 132 and memory 133, FIG. 1).

In step 610, a viewer purchase profile is provided. The purchase profile may be created by the interface device using the processor circuit and viewer history data stored in the memory (e.g., purchase profile 134, cf. FIG. 1). For example, the viewer history data may include prior purchasing transactions performed by the viewer using method 500 (cf. FIG. 5), or method 600. In step 620, correlation values are found between the purchase profile and embedded metadata in the multimedia stream (e.g., metadata 122, cf. FIG. 1). Step 620 may be as described in detail above in relation to step 520 (cf. FIG. 5). In step 630, a request is placed to the viewer to display commercial information about a product or service according to correlation values. In some embodiments, the request may include a request to perform a network search using a search engine to find a plurality of vendors providing an item or service selected according to a correlation value in step 620. Step 630 may be performed at pre-selected viewer actions such as pausing a multimedia stream or fast forwarding a multimedia stream. For example, if a program content in the multimedia stream is a cooking show and the program host is about to use a blender machine, an interface device performing method 600 in step 630 may place a field on the screen with the question for the viewer 'would you like to shop blenders?'

In step 640, a payment tab is placed on an advertisement field in a display. Step 640 may be as described in detail above in relation to step 540 (cf. FIG. 5). In step 650, vendor search results are displayed in the advertisement field. Thus, in the 'blender' example above, when the viewer taps on the 'yes' response (via a remote control device, or simply by touching the screen on the display), in step 650 a search result for blender providers may be shown in a portion of the display. The search results may be listed in order according to price, according to a correlation between a viewer's purchase profile and the text in the search results, or simply according to a premium paid to the interface device by the vendor. In some embodiments, step 650 may include the interface device using a search engine operable in the network. In such embodiments, vendors may pay a premium to the search engine operable in the network, to be displayed at an advantage position in a search result.

In step 660, a vendor selection is received from the viewer from the search results displayed in step 650. In step 660, a selection may be received as the viewer presses or taps an active area on display 175. In step 670, a purchase transaction is completed, similarly to step 570 described in detail above (cf. FIG. 5).

Figure 7:
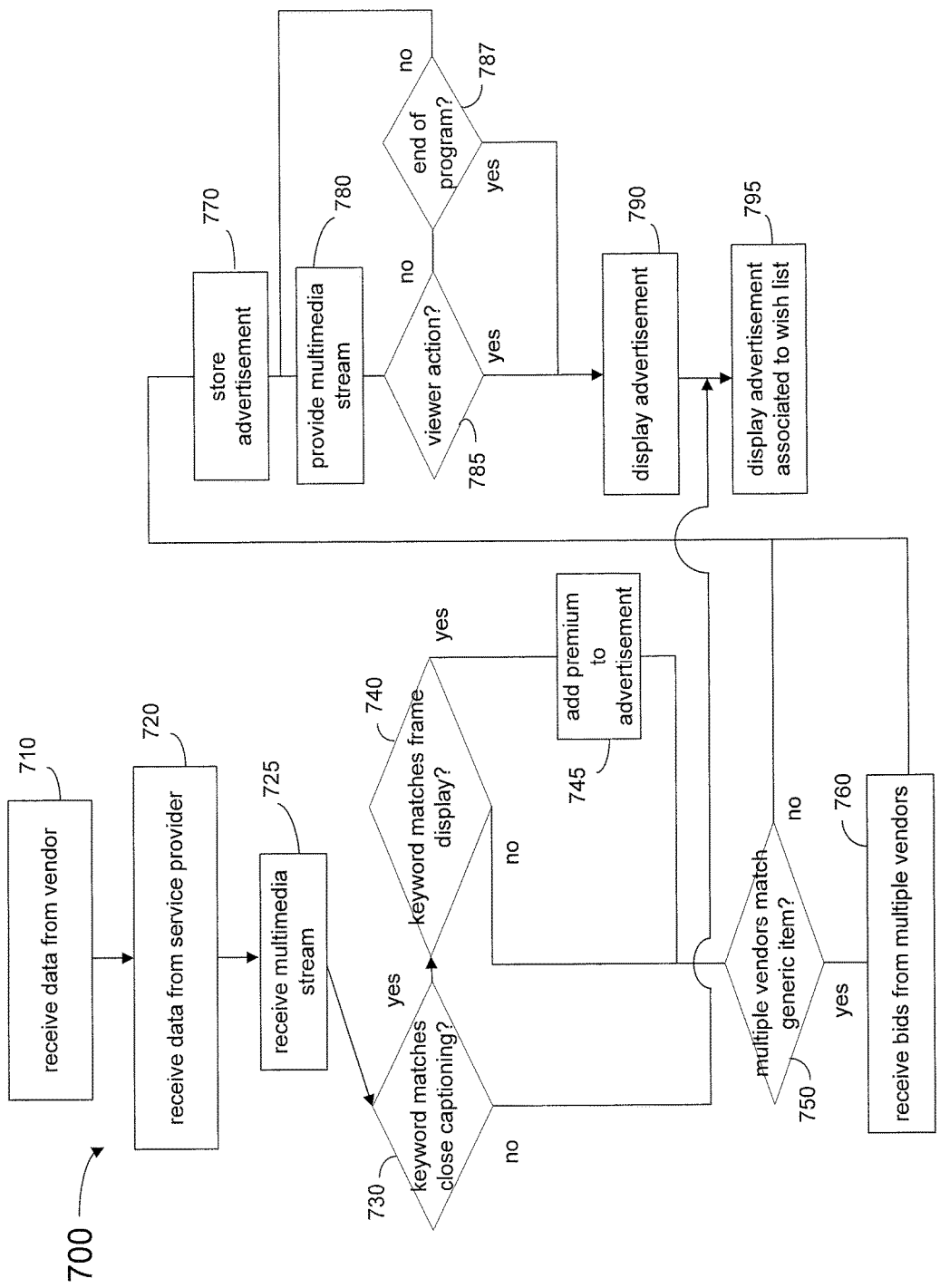
FIG. 7 shows a flow chart in a method for providing targeted commerce in network broadcasting, according to some embodiments.

FIG. 7 shows a flow chart in a method 700 for providing targeted commerce in network broadcasting, according to some embodiments. According to some embodiments, method 700 may be performed by an interface device receiving multimedia streams from a network (e.g., interface device 130 and network 150, FIG. 1). The multimedia streams may include video programs for an audience that may be reached via traditional antenna transmissions, a cable network, or the internet. An interface device may perform steps in FIG. 7 electronically, using processor 132 acting from commands and data stored in memory 133 (cf. FIG. 1).

In step 710, the interface device receives data from a vendor after signing a contract to display advertisements of vendor's products or services. The data may include a set of keywords associated to products or services provided by the vendor. A service provider such as private account service provider 101 may also have a contract with the interface device to provide a method for online payment of products and services advertised by the interface device. According to some embodiments, a vendor having a contract with the interface device manufacturer may also have a private account with the service provider. Furthermore, a viewer having access to multimedia downstream from the broadcaster may also have a private account with the service provider (e.g., viewer 160, FIG. 1). Thus, in step 720, the interface device may receive data from the service provider. The data received in step 720 may be a purchase profile of items that the viewer may be interested in purchasing, or may consider purchasing (e.g., purchase profile 134, cf. FIG. 1).

In step 725, the interface device receives a multimedia stream. For example, the multimedia stream may be downloaded from the network. In some embodiments, step 725 may include buffering the multimedia stream using a memory in the interface device (e.g., memory 133, FIG. 1). Accordingly, in some embodiments step 725 may include storing the multimedia stream in a non-transitory, computer readable medium such as a DVD, a hard drive, a flash memory device, or any other type of memory device.

In step 730, the interface device determines if the keywords provided by the vendor match a close captioning of a program content that the interface device provides to viewers. If the vendor keywords do not match the close captioning of a given program content, the interface device may display advertisements associated to products and services included in the purchase profile provided by the user, in step 795. If the vendor keywords match the close captioning at some point of the stream, then in step 740, the interface device determines if the vendor keywords also match a visual element in a frame of the display associated to the close captioning. For example, the interface device may perform step 740 by using the metadata associated with the multimedia downstream including the program content (e.g., metadata 122, cf. FIG. 1). If the interface device finds a match in step 740, then a premium is added for the vendor in an advertisement associated to the product or service matched in step 740.

Whether or not a match is found in step 740, in step 750, it is determined if multiple vendors have keywords matching the close captioning (step 730) or the frame display (step 740). For example, multiple vendors may provide keywords for a generic item (e.g. 'blenders' or 'travel') that matches a word in the close captioning, and a portion of an image in the frame display. When the interface device determines that no more than one vendor has a match in step 750, then the multimedia stream is provided to the viewer in step 770. When step 750 determines that more than one vendor has a match, then in step 760 the interface device requests and receives bids from the vendors that have a match. In step 760, it is determined to display an advertisement for the highest bidder. In some embodiments, step 760 may include finding a probability value weighted according to the bid received from the vendors. In such embodiments, the interface device may display an advertisement associated to a specific vendor, according to the probability function.

In step 770, the targeted advertisement is stored in the memory. According to some embodiments, step 770 may include placing the advertisement in the stream as the multimedia stream is provided to the viewer. In that regard, some embodiments may perform step 770 together with step 780, described in detail below.

In step 780, the multimedia stream including the program content and advertisements is provided to the viewer. In some embodiments, step 780 is performed with a pre-selected delay, relative to the streaming of the multimedia stream content by the broadcaster into the network. For example, in some embodiments the delay in step 780 may be of a few minutes, or half an hour, or even more than an hour. Accordingly, in some embodiments the viewer may replay the multimedia stream several hours, or days, after the broadcaster placed the multimedia stream in the network. In such embodiments, the viewer may re-play the multimedia stream from a recording in a DVD, CD, or any other non-transitory, computer readable medium where the interface device stored the multimedia stream.

In step 785, the interface device determines whether the viewer has taken an action on the program. For example, in step 785 the interface device may determine whether the viewer has paused or fast forwarded the program stream. If the viewer has not paused, nor fast forwarded the program stream, then in step 787, it is determined whether the program has ended. If the program has not ended, then the interface device continues to provide multimedia stream in step 780. If in step 787, it is determined that the program has ended, or in step 785 it is determined that the viewer has paused the program, then in step 790, the advertisement stored in step 770 is displayed for the viewer. In some embodiments, multiple advertisements may be displayed in step 790, as the memory in the interface device may have more than one targeted advertisement stored. For example, in some embodiments steps 730 through 770 may be repeated in multiple portions of a multimedia stream, before a viewer pauses the program in step 785, or the program ends in step 787.

In some embodiments, method 700 may include step 795 where targeted advertisements are displayed for products or services in the viewer's wish-list provided by the service provider. In some embodiments, in step 795, products or services under promotion by a vendor, or a product that a vendor desires to place in the market at a premium price for the vendor, may be displayed for the viewer.

Accordingly, in embodiments as disclosed herein steps 790 and 795 may include placing 'smart ads' including a payment tab (e.g., payment tab 240, FIG. 2) so that the viewer may immediately purchase an advertised item through an account in a service provider (e.g., service provider 101, FIG. 1).

Embodiments of the invention described above are exemplary only. One skilled in the art may recognize various alternative embodiments from those specifically disclosed. Those alternative embodiments are also intended to be within the scope of this disclosure. As such, the invention is limited only by the following claims.

What is claimed is:

1. A system for targeted commerce in network broadcasting comprising:
   a non-transitory memory; and
   one or more hardware processors coupled to the non-transitory memory and configured to read instructions from the non-transitory memory to cause the system to perform operations comprising:
      receiving, from a network, a multimedia stream;
      determining that a closed captioning string of the received multimedia stream includes an identity of a product corresponding to one or more vendor keywords;
      in response to determining that the closed captioning string includes the identity of the product corresponding to the one or more vendor keywords, identifying and analyzing a plurality of video frames of the received multimedia stream to detect a visual depiction of the product corresponding to the one or more vendor keywords; and
      in response to both determining that the closed captioning string includes the identity of the product corresponding to the one or more vendor keywords and detecting the visual depiction of the product corresponding to the one or more vendor keywords in the plurality of video frames, modifying the received multimedia stream to include an advertisement corresponding to the product.

2. The system of claim 1, wherein the advertisement included in the multimedia stream is caused to be displayed when the identity of the product appears in the closed captioning string.

3. The system of claim 1, wherein the advertisement included in the multimedia stream is caused to be displayed when the visual depiction of the product appears in the plurality of video frames.

4. The system of claim 1, wherein the advertisement included in the multimedia stream is caused to be displayed when the identity of the product appears in the closed captioning string and the visual depiction of the product appears in the plurality of video frames.

5. The system of claim 1, wherein determining that a closed captioning string of the multimedia stream includes an identity of the product for the detected visual depiction comprises determining a correlation between the closed captioning string and the visual depiction.

6. The system of claim 5, wherein modifying the multimedia stream to include the advertisement comprises:
   determining one or more advertisements based on the correlation;
   increasing a probability that one of the one or more advertisements is to be included in the modified multimedia stream based on the correlation; and
   including one of the one or more advertisements with a highest probability.

7. The system of claim 1, wherein modifying the multimedia stream further comprises modifying the multimedia stream to include a payment tab.

8. A non-transitory machine-readable medium comprising a plurality of machine-readable instructions which when executed by one or more processors of an interface device are adapted to cause the interface device to perform a method comprising:
   receiving, from a network, a multimedia stream;
   detecting, from closed captioning strings of the multimedia stream, a generic description of a product;
   determining that the generic description of the product corresponds to one of a plurality of vendor keywords;
   in response to both detecting that the closed captioning strings include the generic description of the product and that the generic description of the product corresponds to one of the plurality of vendor keywords, identifying and analyzing a plurality of video frames of the received multimedia stream to detect a visual depiction of the product corresponding to one of the plurality of vendor keywords; and
   in response to each of detecting that the closed captioning strings include the generic description of the product, determining that the generic description of the product corresponds to one of the plurality of vendor keywords, and detecting the visual depiction of the product corresponding to the one of the plurality of vendor keywords in the received multimedia stream, modifying the multimedia stream to include an advertisement.

9. The non-transitory machine-readable medium of claim 8, wherein the advertisement associated with the one of the plurality of vendor keywords is caused to be displayed when the product is detected as being shown in the multimedia stream.

10. The non-transitory machine-readable medium of claim 8, wherein the plurality of vendor keywords is received from one or more vendors.

11. The non-transitory machine-readable medium of claim 10, wherein when the one of the plurality of vendor keywords is associated with two or more vendors, the method further comprises:
   requesting, from each of the two or more vendors, a bid for the advertisement; and
   receiving, from each of the two or more vendors, the bid for the advertisement,
   wherein the advertisement included in the modified multimedia stream corresponds to an advertisement designated by a vendor of the two or more vendors submitting a highest bid.

12. The non-transitory machine-readable medium of claim 8, wherein the method further comprises determining a correlation between the generic description of the product and a purchaser profile, and
   wherein modifying the multimedia stream to include the advertisement is further based on the determining the correlation between the generic description of the product and the purchaser profile.

13. The non-transitory machine-readable medium of claim 12, wherein a placement of the advertisement included in the multimedia stream is based on the determined correlation between the generic description of the product and a purchaser profile.

14. A method for targeted commerce in network broadcasting, the method comprising:
   receiving, from a network, a multimedia stream;
   determining that a closed captioning string of the received multimedia stream includes an identity of a product corresponding to one or more vendor keywords;
   in response to determining that the closed captioning string includes the identity of the product corresponding to the one or more vendor keywords, identifying and analyzing a plurality of video frames of the received multimedia stream to detect a visual depiction of the product corresponding to the one or more vendor keywords; and
   in response to both determining that the closed captioning string includes the identity of the product corresponding to the one or more vendor keywords and detecting the visual depiction of the product corresponding to the one or more vendor keywords in the plurality of video frames, modifying the received multimedia stream to include an advertisement corresponding to the visual depiction of the product.

15. The method of claim 14, further comprising:
   determining a first correlation between a purchase profile and the closed captioning string;
   determining a second correlation between the purchase profile and metadata describing contents of the plurality of video frames; and
   determining a third correlation between the purchase profile and the one or more vendor keywords.

16. The method of claim 15, wherein the advertisement is identified for display based on the first, second and third correlations.

17. The method of claim 16, wherein the advertisement is identified from a plurality of advertisements by determining a probability that one of the plurality of advertisements has a highest probability for inclusion in the multimedia stream based on the first, second and third correlations.

18. The method of claim 15, wherein the purchase profile is received when a user logs in and discloses an identity of the user.

19. The method of claim 15, wherein the purchase profile is created based on a history of purchases by a user.

20. The method of claim 15, wherein the purchase profile includes one of a list of items that a user is interested in purchasing or a generic list of items.

* * * * *